United States Patent
Wang et al.

(10) Patent No.: US 11,171,569 B2
(45) Date of Patent: Nov. 9, 2021

(54) WAKE-UP METHOD AND WAKE-UP SYSTEM FOR BATTERY MANAGEMENT SYSTEM

(71) Applicant: Contemporary Amperex Technology Co., Limited, Ningde (CN)

(72) Inventors: Liansong Wang, Ningde (CN); Zhimin Dan, Ningde (CN); Changjian Liu, Ningde (CN); Fupeng Cai, Ningde (CN); Fuming Ye, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/137,411

(22) Filed: Dec. 30, 2020

(65) Prior Publication Data

US 2021/0119549 A1  Apr. 22, 2021

Related U.S. Application Data

(63) Continuation of application No. PCT/CN2020/095051, filed on Jun. 9, 2020.

(30) Foreign Application Priority Data

Jul. 16, 2019 (CN) .......................... 201910641799.5

(51) Int. Cl.
   *H02M 3/335* (2006.01)
   *H02J 7/00* (2006.01)
(52) U.S. Cl.
   CPC ......... *H02M 3/33592* (2013.01); *H02J 7/007* (2013.01)
(58) Field of Classification Search
   CPC .... H02M 3/33592; H02M 3/335; H02J 7/007; H02J 7/00
   (Continued)

(56) References Cited

U.S. PATENT DOCUMENTS

2012/0019200 A1  1/2012  Abe
2012/0139337 A1* 6/2012  Kim ........................ B60L 50/64
                                         307/9.1
(Continued)

FOREIGN PATENT DOCUMENTS

CN    103904373 A    7/2014
CN    105305846 A    2/2016
(Continued)

OTHER PUBLICATIONS

PCT International Search Report for PCT/CN2020/095051, dated Sep. 1, 2020, 12 pages.
(Continued)

*Primary Examiner* — Richard Isla
*Assistant Examiner* — Dung V Bui
(74) *Attorney, Agent, or Firm* — Law Offices of Liaoteng Wang

(57) ABSTRACT

The present application discloses a wake-up method and wake-up system for a battery management system. The method may include converting, by a conversion unit, a low-voltage power signal detected at a low-voltage input port into a high-voltage wake-up signal, and receiving, by a high-voltage control module, a working voltage provided by a power battery pack under control of the high-voltage wake-up signal; controlling, by the high-voltage control module, the high-voltage transmission module to be turned on, providing the working voltage to a synchronous rectifying module by the turned-on high-voltage transmission module, and converting high-voltage electric energy provided by the power battery pack into low-voltage electric energy; and transmitting, under control of the synchronous rectifying module, the low-voltage electric energy to the low-voltage controller, and waking up the battery management system by the low-voltage controller.

20 Claims, 4 Drawing Sheets

(58) Field of Classification Search
USPC .......................................................... 320/135
See application file for complete search history.

(56) References Cited

U.S. PATENT DOCUMENTS

| | | | | |
|---|---|---|---|---|
| 2013/0119755 | A1* | 5/2013 | Klesyk | B60L 1/00 307/9.1 |
| 2013/0119931 | A1* | 5/2013 | Klesyk | B60L 1/00 320/109 |
| 2013/0120889 | A1* | 5/2013 | Klesyk | B60L 53/14 361/87 |
| 2013/0127418 | A1* | 5/2013 | Oh | H02J 7/00716 320/109 |
| 2014/0009092 | A1 | 1/2014 | Ma et al. | |
| 2015/0097527 | A1* | 4/2015 | DeDona | B60L 58/20 320/109 |
| 2016/0056704 | A1* | 2/2016 | Deboy | H02M 3/33592 363/21.13 |
| 2018/0037124 | A1* | 2/2018 | Jang | B60L 53/122 |
| 2018/0159574 | A1* | 6/2018 | Li | H04B 1/1615 |

FOREIGN PATENT DOCUMENTS

| | | |
|---|---|---|
| CN | 105789689 A | 7/2016 |
| CN | 105978099 A | 9/2016 |
| CN | 103636108 B | 10/2016 |
| CN | 106257813 A | 12/2016 |
| CN | 106340916 A | 1/2017 |
| CN | 106494234 A | 3/2017 |
| CN | 206894283 U | 1/2018 |
| CN | 108215915 A | 6/2018 |
| CN | 108270357 A | 7/2018 |
| CN | 108944486 A | 12/2018 |
| KR | 20180057231 A | 5/2018 |

OTHER PUBLICATIONS

The First Office Action forChinese Application No. 201910641799.5, dated Sep. 3, 2021, 20 pages.

* cited by examiner

WAKE-UP METHOD AND WAKE-UP SYSTEM FOR BATTERY MANAGEMENT SYSTEM

CROSS-REFERENCE TO RELATED APPLICATIONS

This application is a continuation of International Application No. PCT/CN2020/095051, filed on Jun. 9, 2020, which claims priority to Chinese Patent Application No. 201910641799.5 entitled "WAKE-UP METHOD AND WAKE-UP SYSTEM FOR BATTERY MANAGEMENT SYSTEM" and filed on Jul. 16, 2019, both of which are incorporated herein by reference in their entirety.

TECHNICAL FIELD

This application relates to the field of battery management, and particularly to a wake-up method and wake-up system for a battery management system.

BACKGROUND

At present, due to the fact of energy shortage and increasingly serious environmental pollution, it is imperative to develop pure electric new energy vehicles. New energy vehicles will become an important way to reduce vehicle exhaust emission, reduce energy consumption and relieve environmental pressure. Different from traditional fuel vehicles, a new energy vehicle includes a high-voltage electrical system and a low-voltage electrical system. Since there are many high-voltage electrical components on the new energy vehicle, in order to ensure the safety of users and avoid the risk of electrocution, the high-voltage side and the low-voltage side are generally isolated by a transformer.

When a Battery Management System (Battery Management System, BMS) suddenly powers down and enters into sleep or is deeply fed by lead acid, the BMS cannot be started again, and thus the BMS is not able to monitor and handle the condition of a vehicle battery pack.

SUMMARY

Embodiments of the present application may provide a wake-up method and a wake-up system for a battery management system.

According to one aspect of the embodiments of the present application, a wake-up method for a battery management system is provided, which is used in a wake-up system for the battery management system, the wake-up system includes a power battery pack, a low-voltage input port, a conversion unit, a high-voltage control module, a high-voltage transmission module, a synchronous rectifying module and a low-voltage controller, the wake-up method for the battery management system includes:

converting, by the conversion unit, a low-voltage power signal detected at the low-voltage input port into a high-voltage wake-up signal, and receiving, by the high-voltage control module, a working voltage provided by the power battery pack under control of the high-voltage wake-up signal;

controlling, by the high-voltage control module, the high-voltage transmission module to be turned on, providing the working voltage to the synchronous rectifying module by the turned-on high-voltage transmission module, and converting high-voltage electric energy provided by the power battery pack into low-voltage electric energy; and transmitting, under control of the synchronous rectifying module, the low-voltage electric energy to the low-voltage controller, and waking up the battery management system by the low-voltage controller.

According to another aspect of the embodiments of the present application, a wake-up system for a battery management system is provided, including a power battery pack, a low-voltage input port, a conversion unit, a high-voltage control module, a high-voltage transmission module, a synchronous rectifying module and a low-voltage controller, the low-voltage input port is connected to the high-voltage control module through the conversion unit, the high-voltage control module is connected to the power battery pack and the high-voltage transmission module, the high-voltage transmission module is connected to the low-voltage controller through the synchronous rectifying module, and the low-voltage controller is connected to the battery management system;

the low-voltage input port is configured to receive a low-voltage power signal;

the conversion unit is configured to convert the low-voltage power signal into a high-voltage wake-up signal;

the high-voltage control module is configured to receive, under control of the high-voltage wake-up signal, a working voltage provided by the power battery pack, and control the high-voltage transmission module to be turned on;

the high-voltage transmission module is configured to, when turned on, provide the working voltage to the synchronous rectifying module, and convert high-voltage electric energy in the power battery pack into low-voltage electric energy; and the synchronous rectifying module is configured to transmit, under control of the synchronous rectifying module, the low-voltage electric energy to the low-voltage controller, and wake up the battery management system by the low-voltage controller.

BRIEF DESCRIPTION OF THE DRAWINGS

To explain the technical solutions of the embodiments of the present application more clearly, the drawings to be used in the embodiments of the present application will be briefly introduced below. A person of ordinary skill in the art is also able to obtain other drawings based on these drawings without creative work.

DETAILED DESCRIPTION

Features and exemplary embodiments of various aspects of the present application will be described in detail below. In order to make the objects, technical solutions and advantages of the present application clear, the present application will be further described in detail below in conjunction with the drawings and embodiments. It should be understood that the specific embodiments described herein are only configured for explaining the present application, and not configured for limiting the present application. For a person skilled in the art, the present application may be implemented without some of these specific details. The following descriptions of the embodiments are merely to provide a better understanding of the present application by illustrating the examples of the present application.

It should be noted that, in the present application, relational terms, such as first and second, are used merely to distinguish one entity or operation from another entity or operation, without necessarily requiring or implying any actual such relationships or orders of these entities or operations. Moreover, the terms "comprise", "include", or any other variants thereof, are intended to represent a non-exclusive inclusion, such that a process, method, article or device including a series of elements includes not only those elements, but also other elements that are not explicitly listed or elements inherent to such a process, method, article or device. Without more constraints, the elements following an expression "comprise/include . . . " do not exclude the existence of additional identical elements in the process, method, article or device that includes the elements.

For a better understanding of the present application, a wake-up method and a wake-up system for a battery management system according to the embodiments of the present application will be described in detail below with reference to the drawings. It should be noted that these embodiments are not used to limit the scope of disclosure of the present application.

Figure 1:
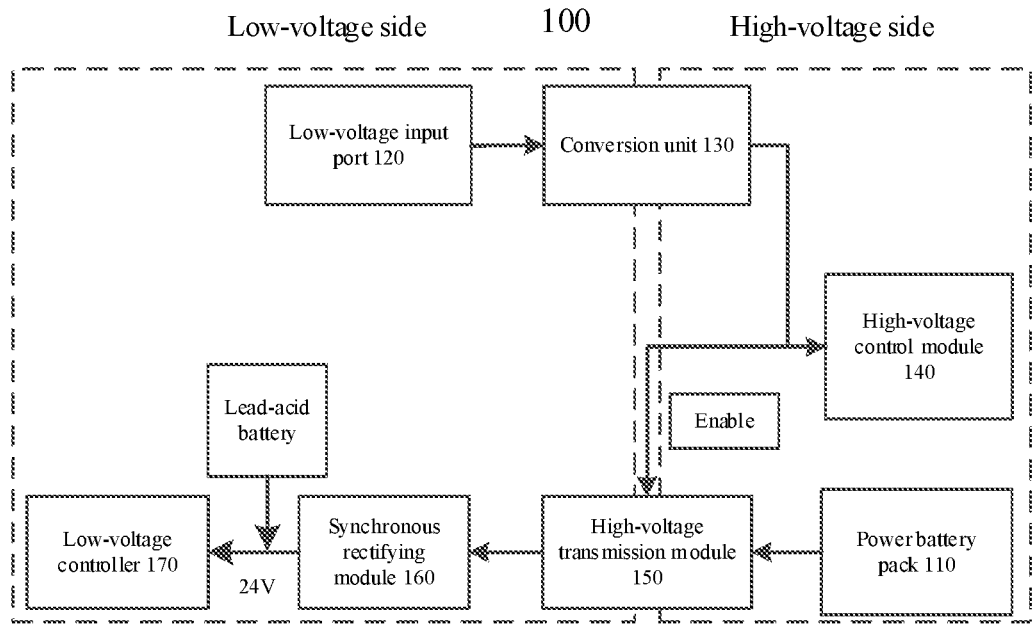
FIG. 1 is a schematic structural diagram showing a sleep charging wake-up method for a battery management system of an electric vehicle according to an embodiment of the present application.

FIG. 1 is a schematic structural diagram showing a sleep charging wake-up method for a battery management system of an electric vehicle according to an embodiment of the present application. As shown in FIG. 1, a wake-up system 100 for a battery management system in the embodiments of the present application may include a power battery pack 110, a low-voltage input port 120, a conversion unit 130, a high-voltage control module 140, a high-voltage transmission module 150, a synchronous rectifying module 160 and a low-voltage controller 170.

Herein, the low-voltage input port 120 is connected to the high-voltage control module 140 through the conversion unit 130, the high-voltage control module 140 is connected to the power battery pack 110 and the high-voltage transmission module 150, the high-voltage transmission module 150 is connected to the low-voltage controller 170 through the synchronous rectifying module 160, and the low-voltage controller 170 is connected to the battery management system (not shown).

The low-voltage input port 120 is configured to receive a low-voltage power signal.

The conversion unit 130 is configured to convert the low-voltage power signal into a high-voltage wake-up signal.

The high-voltage control module 140 is configured to receive, under control of the high-voltage wake-up signal, a working voltage provided by the power battery pack, and control the high-voltage transmission module to be turned on.

The high-voltage transmission module 150 is configured to provide, when turned on, the working voltage to the synchronous rectifying module, and convert high-voltage electric energy in the power battery pack into low-voltage electric energy.

The synchronous rectifying module 160 is configured to transmit, under control of the synchronous rectifying module, the low-voltage electric energy to the low-voltage controller, and wake up the battery management system by the low-voltage controller.

In the embodiments of the present application, since a new energy vehicle includes a high-voltage electrical system and a low-voltage electrical system, in order to ensure the safety of users and avoid the risk of electrocution, high-voltage electrical components in the high-voltage electrical system may be isolated from low-voltage electrical components in the low-voltage electrical system by an isolating component.

In an embodiment, the isolating component may include the conversion unit 130 and the high-voltage transmission module 150. Herein, the conversion unit 130 and the high-voltage transmission module 150 may achieve an electrical isolation between the high-voltage electrical components and the low-voltage electrical components, the conversion unit 130 may convert the received low-voltage signal into a high-voltage signal, and the high-voltage transmission module 150 may convert the received high-voltage electric energy into low-voltage electric energy.

As shown in FIG. 1, the low-voltage side may represent a low-voltage signal input terminal side of the conversion unit 130 and a low-voltage electric energy output terminal side of the high-voltage transmission module 150; and the high-voltage side may represent a high-voltage signal output terminal side of the conversion unit 130 and a high-voltage electric energy input terminal side of the high-voltage transmission module 150. In FIG. 1, the low-voltage electrical components may include the low-voltage input port 120, the synchronous rectifying module 160 and the low-voltage controller 170, and the high-voltage electrical components may include the power battery pack 110 and the high-voltage control module 140.

In an embodiment, a low-voltage charging system of 12 V or 24 V may be input to the low-voltage signal input terminal side. A lead-acid battery may be connected to the BMS through the low-voltage controller. When the electric vehicle is parked for a long time or the electric vehicle is charged, the low-voltage controller may cut off the connection between the BMS and the lead-acid battery, and at this time, the BMS powers down and enters into sleep due to its powering down.

In order to keep the BMS monitoring and handling relevant information, such as a State Of Charge (State Of Charge, SOC), a current and a voltage, of the battery pack, the wake-up method given by the battery management system of the wake-up system in the embodiments of the present application may be utilized to prevent the BMS from staying in sleep for a long time, so that the BMS may be able to monitor and handle the condition of the vehicle battery pack.

The wake-up method and the wake-up system for the battery management system according to the embodiments of the present application may wake up the BMS by the low-voltage power signal, and the low-voltage power supply may be a direct current power supply or an alternating current power supply. When a voltage signal is detected at the low-voltage input port, with the wake-up method and the wake-up system according to the embodiments of the present application, the entire BMS system will be waked up and starts working normally. The wake-up method and the wake-up system for the battery management system according to the embodiments of the present application may wake up the BMS without the lead acid of the vehicle, the consumption of lead-acid batteries is reduced.

Figure 2:
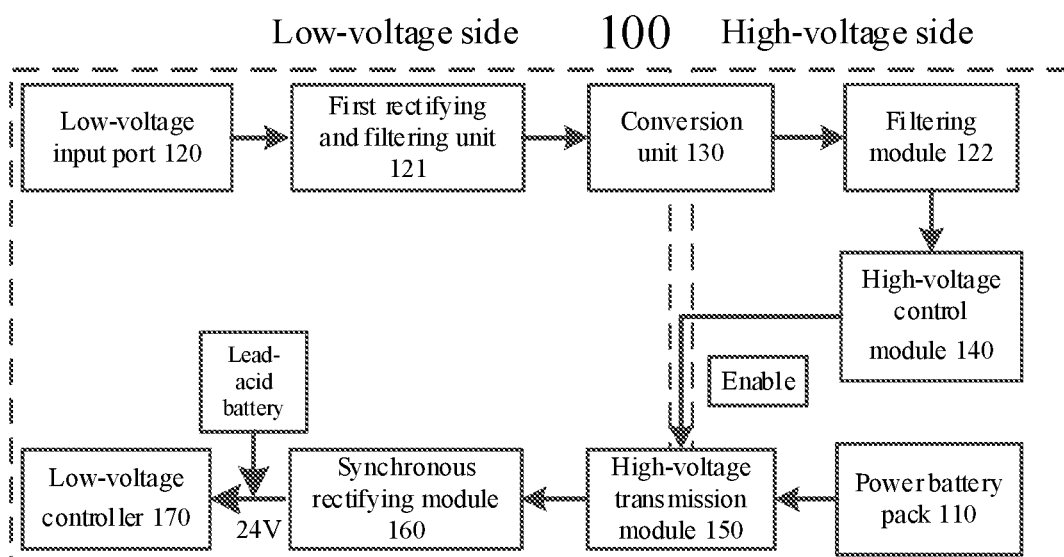
FIG. 2 is a schematic structural diagram showing a wake-up system for a battery management system according to another embodiment of the present application.

FIG. 2 shows a schematic structural diagram of a wake-up system for a battery management system according to another embodiment of the present application. As shown in FIG. 2, in an embodiment, the wake-up system 100 for the battery management system may further include:

a first rectifying and filtering unit 121 connected between the low-voltage input port and an input terminal of the conversion unit, and configured to rectify and filter the low-voltage power signal.

The conversion unit 130 is further configured to convert the rectified and filtered low-voltage power signal into the high-voltage wake-up signal.

Still referring to FIG. 2, in an embodiment, the wake-up system 100 for the battery management system may further include:

a filtering module 122 connected to an output terminal of the conversion unit 130, and configured to rectify and filter the high-voltage wake-up signal obtained by the conversion.

The high-voltage control module 140 is further configured to receive, under control of the rectified and filtered high-voltage wake-up signal, a working voltage provided by the power battery pack, and control the high-voltage transmission module to be turned on.

In an embodiment, the conversion unit 130 may include any of an optocoupler circuit, a flyback power circuit and a forward power circuit. The conversion unit in the embodiments of the present application will be described in detail below with reference to FIGS. 3, 4 and 5.

Figure 3:
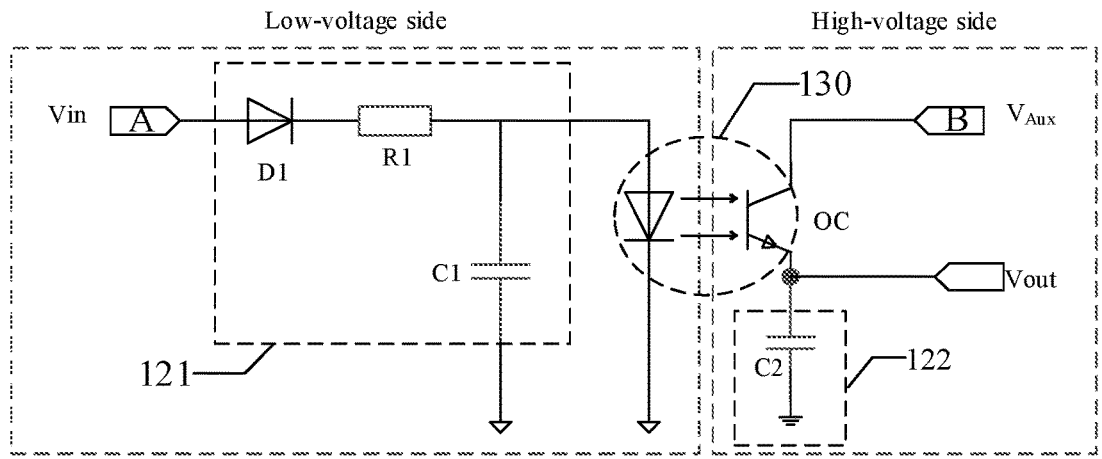
FIG. 3 is a schematic structural diagram showing an optocoupler circuit according to an embodiment of the present application.

FIG. 3 shows a schematic structural diagram of an optocoupler circuit according to an embodiment of the present application. As shown in FIG. 3, the conversion unit 130 may include an optocoupler circuit.

In an embodiment, the optocoupler circuit may include, for example, an Optical Coupler (Optical Coupler, OC), and the optical coupler may also be referred to as a photoelectronic isolator or a photoelectronic coupler. The optical coupler may use light as a medium to transmit electrical signals, so it may provide a good isolating effect for high-voltage electrical signals and low-voltage electrical signals, and achieve an electrical isolation between the high-voltage electrical components and the low-voltage electrical components.

Still referring to FIG. 3, in an embodiment, the first rectifying and filtering unit 121 may include a first rectifying diode D1, a first resistor R1 and a first capacitor C1.

Herein, one terminal of the first diode D1 is connected to the low-voltage input port, the other terminal of the first diode D1 is connected to one terminal of the first resistor R1, the other terminal of the first resistor R1 is connected to the input terminal of the conversion unit 130, one terminal of the first capacitor C1 is connected to the other terminal of the first resistor R1, and the other terminal of the first capacitor C1 is connected to a reference voltage terminal.

Still referring to FIG. 3, in an embodiment, the filtering module 122 may include a second capacitor network C2. Herein, one terminal of the second capacitor network C2 is connected to an output terminal of the optical coupler (OC), and the other terminal of the second capacitor network C2 is connected to a reference voltage terminal.

In this embodiment, when the BMS system is in sleep, and when the low-voltage input port A inputs a low-voltage wake-up power Vin, the low-voltage wake-up power first passes through the first diode D1 in the first rectifying and filtering unit 121 for being rectified, and then passes through the first resistor R1 and the first capacitor C1 for being filtered, and the low-voltage wake-up power Vin filtered by the first rectifying and filtering unit is converted into a high-voltage wake-up signal Vout of the high-voltage side by the conversion unit 130.

Figure 4:
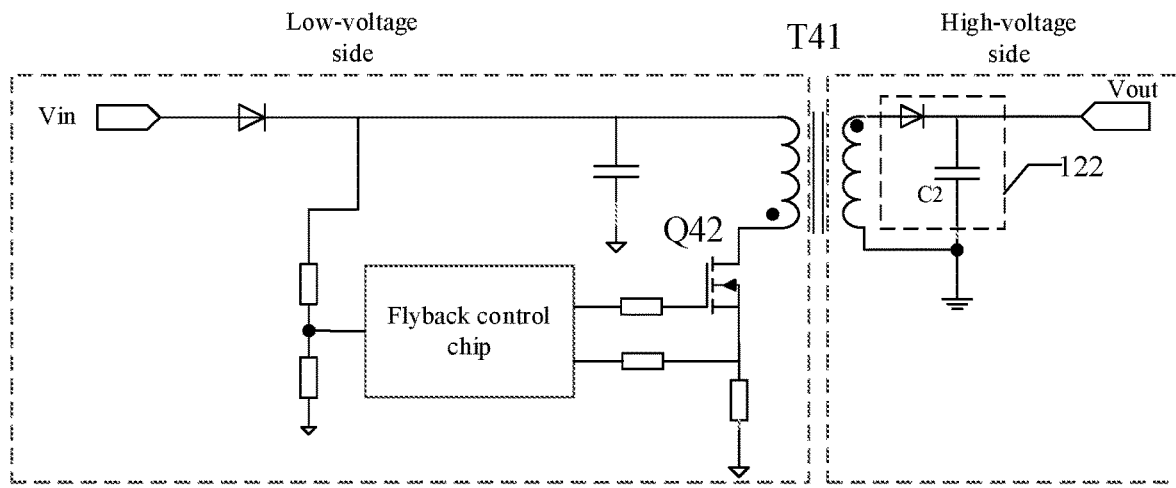
FIG. 4 is a schematic structural diagram showing a flyback power circuit according to an embodiment of the present application.
Figure 5:
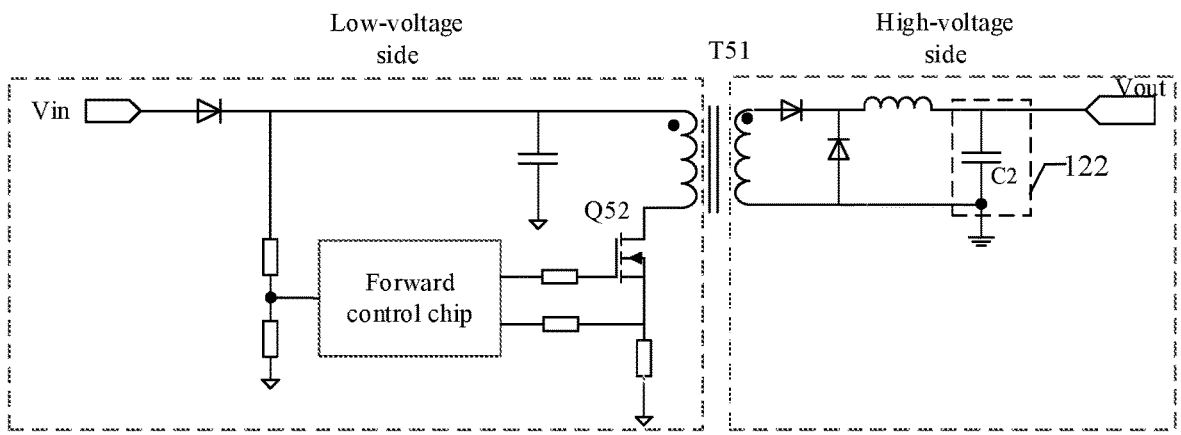
FIG. 5 is a schematic structural diagram showing a forward power circuit according to another embodiment of the present application.

FIG. 4 shows a schematic structural diagram of a flyback power circuit according to an embodiment of the present application; and FIG. 5 shows a schematic structural diagram of a forward power circuit according to another embodiment of the present application.

As shown in FIG. 4, the flyback power circuit includes a flyback control chip and a flyback transformer T41, and the flyback control chip and the flyback transformer T41 may be connected by a flyback power switch tube Q42.

When the flyback control chip controls the flyback power switch tube Q42 to be turned on, the flyback transformer T41 may store the electric energy in the low-voltage wake-up power Vin into a primary winding of the flyback transformer T41; and when the flyback control chip controls the flyback power switch tube Q42 to be turned off, the primary winding of the flyback transformer T41 couples the stored electric energy to a secondary winding of the flyback transformer T41, and the flyback transformer T41 outputs the high-voltage wake-up signal Vout.

Still referring to FIG. 4, in an embodiment, the filtering module 122 may include a second capacitor network C2. Herein, one terminal of the second capacitor network C2 is connected to an output terminal of the flyback transformer T41, and the other terminal of the second capacitor network C2 is connected to a reference voltage terminal.

In the description of the embodiments of the present application, a primary side of a transformer represents a voltage input side, and a secondary side of the transformer represents a voltage output side after a transforming of the transformer.

As shown in FIG. 5, the forward power circuit includes a forward control chip and a forward transformer T51, and the forward control chip and the forward transformer T51 may be connected by a forward power switch tube Q52.

When the forward control chip controls the forward power switch tube Q52 to be turned on, a primary winding of the forward transformer T51 couples the electric energy in the low-voltage wake-up power Vin to a secondary winding of the forward transformer T51, and the forward transformer T51 outputs the high-voltage wake-up signal Vout.

Still referring to FIG. 5, in an embodiment, the filtering module 122 may include a second capacitor network C2. Herein, one terminal of the second capacitor network C2 is connected to an output terminal of the forward transformer T51, and the other terminal of the second capacitor network C2 is connected to a reference voltage terminal. In an embodiment, the second capacitor network C2 in the above FIGS. 3, 4 and 5 may include a plurality of capacitors connected in parallel.

It can be seen from FIGS. 3, 4 and 5 that the embodiments of the present application may use the optocoupler circuit, the flyback power circuit or the forward power circuit to isolate the high-voltage electrical components in the high-voltage electrical system from the low-voltage electrical components in the low-voltage electrical system, and to carry out conversion between low and high voltages.

It should be understood that in the embodiments of the present application, other isolating and transforming components may also be used to achieve the same function as the conversion unit 130, that is, the isolating and transforming components may convert the low-voltage wake-up power Vin of the low-voltage side into the high-voltage wake-up signal Vout of the high-voltage side, which is not described herein.

Figure 6:
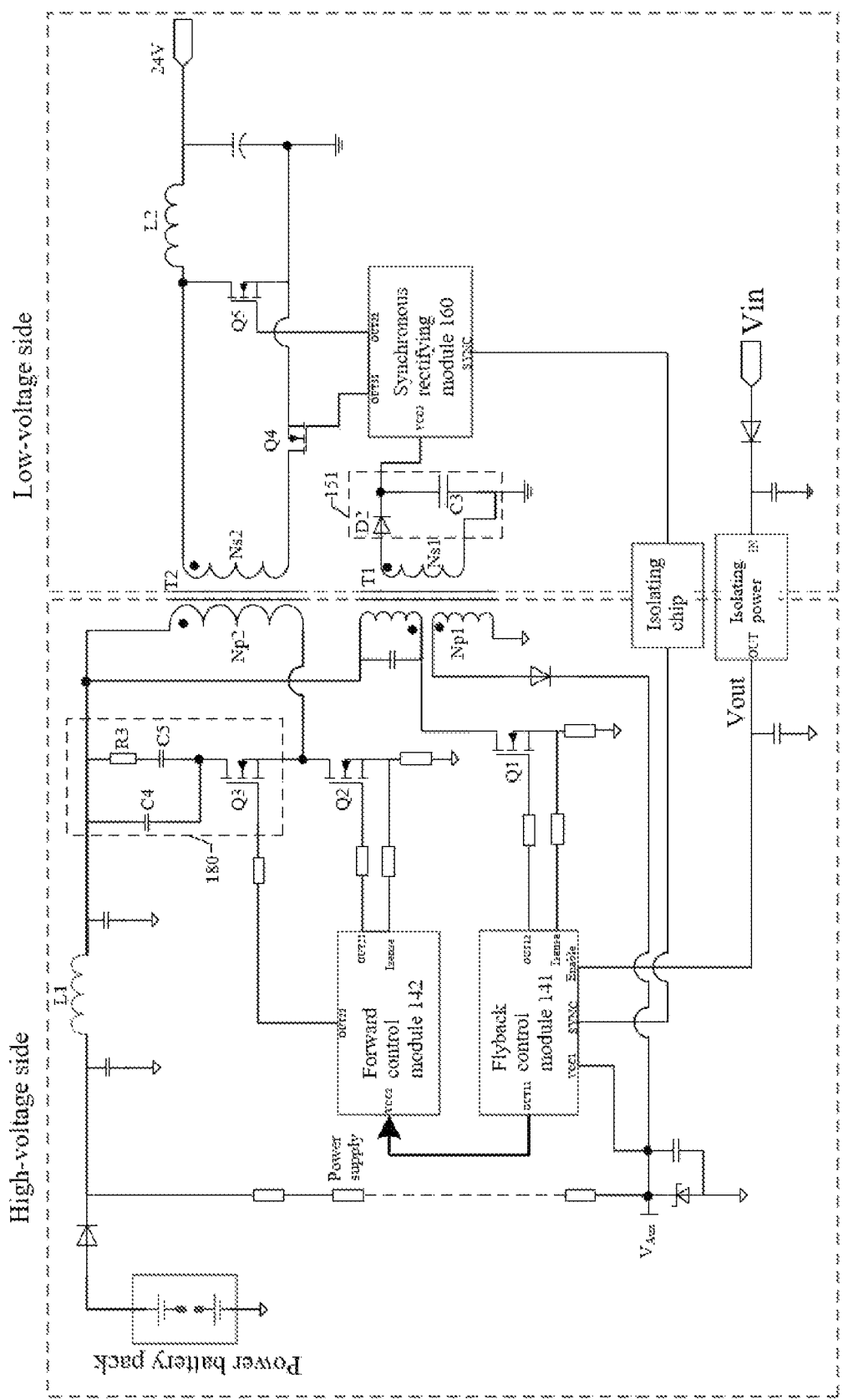
FIG. 6 is a detailed structural diagram showing a battery management system according to exemplary embodiments of the present application.

FIG. 6 shows a detailed structural diagram of a battery management system according to exemplary embodiments of the present application. As shown in FIG. 6, in an embodiment, the high-voltage control module 140 includes a flyback control module 141 and a forward control module 142. The flyback control module 141 includes an enabling terminal (Enable), a flyback power terminal VCC1, and a first flyback output terminal OUT11, and the forward control module 142 includes a forward power terminal VCC2.

Herein, the flyback control module 141 may be configured to receive the high-voltage wake-up signal through the enabling terminal (Enable), and control, by the high-voltage wake-up signal, a connection between the forward power terminal VCC1 and the power battery pack to be turned on, so that the forward power terminal VCC1 receives the working voltage provided by the power battery pack.

The flyback control module 141 may be further configured to output the working voltage to the forward power terminal VCC2 through the first forward output terminal OUT11, so that the forward control module 142 starts working.

In the embodiments of the present application, when the high-voltage wake-up signal Vout is detected at the high-voltage side, the high-voltage wake-up signal Vout will be input to the enabling terminal (Enable) of the flyback control module, and at this time, the flyback control module will be enabled and starts working.

Still referring to FIG. 6, in an embodiment, the high-voltage transmission module further includes a first transformer T1 and a second transformer T2. In this embodiment, the first transformer T1 and the second transformer T2 may be step-up transformers.

The flyback control module 141 is further configured to control the first transformer T1 to be turned on, so that the power battery pack provides the working voltage to the synchronous rectifying module 160 through the turned-on first transformer T1.

The forward control module 142 is further configured to control the second transformer T2 to be turned on, and convert the high-voltage electric energy in the power battery pack into the low-voltage electric energy through the turned-on second transformer T2.

As shown in FIG. 6, in an embodiment, the high-voltage transmission module further includes a first switching element Q1, and a second flyback output terminal OUT12 of the flyback control module 141 is connected to a primary winding Np1 of the first transformer T1 through the first switching element Q1.

The flyback control module 141 is further configured to control the first switching element Q1 to be turned on and turned off through a Pulse Width Modulation (Pulse Width Modulation, PWM) signal output from the second flyback output terminal OUT12.

When the first switching element Q1 is turned on, the power battery pack is connected to the primary winding Np1 of the first transformer T1, and the primary winding Np1 of the first transformer T1 stores energy using the high-voltage electric energy.

When the first switching element Q1 is turned off, the power battery pack is disconnected from the primary winding Np1 of the first transformer T1, and the energy stored in the primary winding Np1 of the first transformer is coupled to a secondary winding Ns1 of the first transformer T1.

The high-voltage transmission module is configured to provide the working voltage to the synchronous rectifying module 160 through the energy coupled to the secondary winding Ns1 of the first transformer T1.

As shown in FIG. 6, in an embodiment, the synchronous rectifying module 160 may include a rectifying module power terminal VCC3; and the high-voltage transmission module may further include:

a second rectifying and filtering unit 151, and the second rectifying and filtering unit 151 may be connected between the secondary winding Ns1 of the first transformer T1 and the rectifying module power terminal VCC3, and is configured to filter the electric energy coupled to the secondary winding of the first transformer T1.

The high-voltage transmission module is further configured to provide the working voltage to the synchronous rectifying module 160 using the rectified and filtered energy coupled to the secondary winding Ns1 of the first transformer T1.

In an embodiment, the second rectifying and filtering unit 151 may include a second rectifying diode D2 and a third capacitor C3. Herein, one terminal of the second rectifying diode D2 may be connected to the secondary winding Ns1 of the first transformer T1, the other terminal of the second rectifying diode D2 may be connected to one terminal of the third capacitor C3, and the other terminal of the third capacitor C3 may be connected to a reference voltage terminal; and the power terminal VCC3 of the synchronous rectifying module 160 is connected to the other terminal of the second rectifying diode D2 and the one terminal of the third capacitor C3.

In the embodiments of the present application, when the flyback control module starts working, the switching element Q1 may be controlled, through PWM waves output by the second flyback output terminal OUT12, to be turned on and turned off, and in turn the storage and release of energy in the windings of the first transformer T1 are controlled. Specifically, when Q1 is turned on, the primary winding Np1 of the first transformer T1 stores energy, and the secondary winding diode D2 of the first transformer T1 is in a non-conducting state due to a reverse voltage; and when Q1 is turned off, the secondary winding diode D2 of the first transformer T1 is in a conducting state due to a forward voltage, and at this time, the electric energy in the primary winding Np1 of the first transformer T1 will be coupled to the secondary winding Ns1, rectified by the second rectifying diode D2, filtered by the third capacitor C3 and then output, and the electric energy is provided to the synchronous rectifying module.

In an embodiment, the high-voltage transmission module further includes a second switching element Q2, and the forward control module 142 includes a first forward output terminal OUT21.

The first forward output terminal OUT21 of the forward control module 142 is connected to a primary winding Np2 of the second transformer T2 through the second switching element Q2.

The forward control module 142 is further configured to control the second switching element Q2 to be turned on and turned off through a pulse width modulation signal provided by the first forward output terminal OUT21.

When the second switching element Q2 is turned on, the power battery pack is connected to the primary winding Np2 of the second transformer T2, and couples the high-voltage electric energy to a secondary winding Ns2 of the second transformer T2 through the primary winding Np2 of the second transformer T2, to obtain the low-voltage electric energy output from the secondary winding Ns2 of the second transformer T2.

In the embodiments of the present application, when the second flyback output terminal of the flyback control module outputs a pulse width modulation signal, the first flyback output terminal may output electric energy to power the forward control module, and the forward control module starts working. The first forward output terminal of the forward control module outputs a pulse width modulation signal to control the second switching element to be turned on and turned off, and in turn to control the storage and release of energy in the windings of the second transformer.

In an embodiment, the synchronous rectifying module 160 is configured to detect the low-voltage electric energy, and transmit, when the low-voltage electric energy satisfies a low-voltage threshold condition, the low-voltage electric energy to the low-voltage controller, to wake up the battery management system by the low-voltage controller.

Still referring to FIG. 6, in an embodiment, the synchronous rectifying module 160 may include the rectifying module power terminal VCC3, a first rectifying module output terminal OUT31, a second rectifying module output terminal OUT32, a fourth switching element Q4, and a fifth switching element Q5. Herein, the first rectifying module output terminal OUT31 is configured to control the fourth switching element Q4 to be turned on, and the second rectifying module output terminal OUT32 is configured to control the fifth switching element Q5 to be turned on.

In the embodiments of the present application, after the flyback control module works, a synchronous rectifying chip starts working. When the second switching element of the high-voltage transmission module is turned on, the energy in the primary side of the second transformer is coupled to the secondary side of the second transformer. The synchronous rectifying module may control, by monitoring the output voltage of the secondary side of the second transformer, the first rectifying module output terminal and the second rectifying module output terminal, and control the fourth switching element and the fifth switching element to be turned on and turned off, and in turn control the second transformer and the low-voltage controller be turned on and turned off.

In an embodiment, the wake-up system 100 for the battery management system may further include a clamping circuit module 180; and the clamping circuit module 180 is configured to absorb leakage inductance energy of the second transformer T2, so that a clamping voltage of a clamping switching element Q3 satisfies a preset voltage threshold.

In an embodiment, the clamping circuit module 180 may include the clamping switching element Q3, a clamping capacitor C4, a charging capacitor C5, and a third resistor R3. Herein, a control terminal of the clamping switching element Q3 is connected to the second forward output terminal OUT22 of the forward control module, and configured to control the clamping circuit module 180 to be turned on.

Referring to FIG. 6, when the second switching element Q2 is turned off, the forward control module 142 controls, through the second forward output terminal OUT22, the clamping switching element Q3 to start working. The clamping circuit module 180 may be configured to absorb the leakage inductance energy of the second transformer T2, thereby a voltage clamp of the second switching element Q2 is kept stable, a large voltage stress is avoided on the second switching element Q2, the consumption of the second switching element Q2 is reduced and the working life of the second switching element Q2 is prolonged.

According to the wake-up system for the battery management system in the embodiments of the present application, the energy in the power battery pack of the high-voltage side is converted to provide stable electric energy for the low-voltage side, and thus when the BMS system is in sleep, the low voltage input from the low-voltage side is converted by the conversion unit to obtain the wake-up voltage for the high-voltage side. With this wake-up voltage, the power battery pack, the high-voltage control module and the high-voltage transmission unit of the high-voltage side start working, thereby the electric energy in the high-voltage battery pack is converted into a stable low-voltage direct current power supply to provide a stable power input for the low-voltage controller, to ensure the entire BMS system works normally and reduce the consumption of lead-acid batteries in the vehicle.

Figure 7:
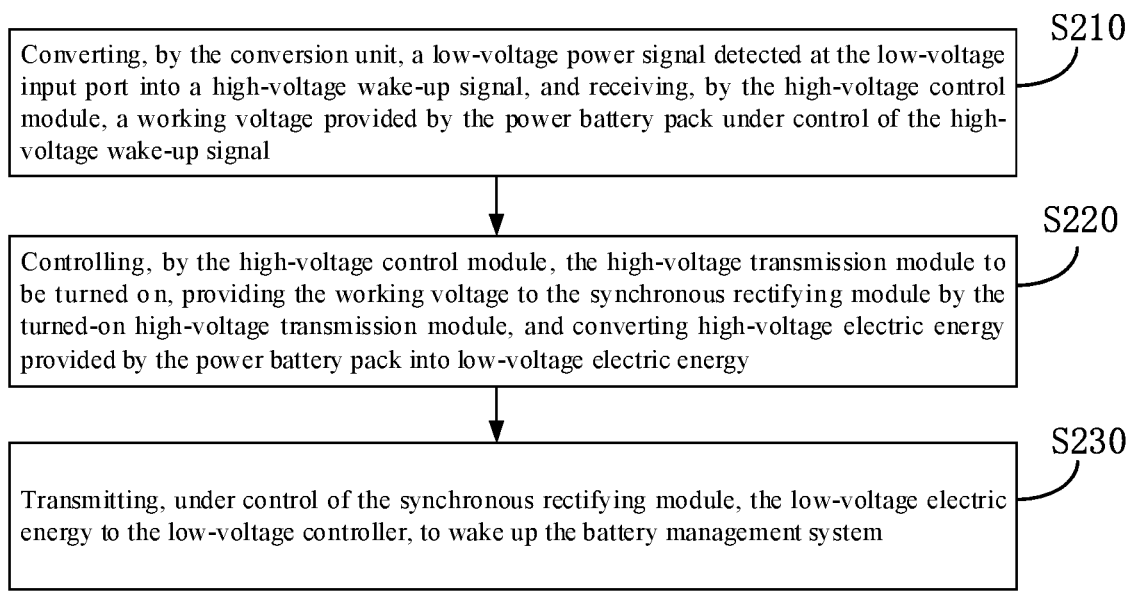
FIG. 7 is a flowchart showing a wake-up method for a battery management system according to an embodiment of the present application.

FIG. 7 shows a flowchart of a wake-up method for a battery management system according to an embodiment of the present application. As shown in FIG. 7, the wake-up method for the battery management system may include the following steps:

Step S210, converting, by the conversion unit, a low-voltage power signal detected at the low-voltage input port into a high-voltage wake-up signal, and receiving, by the high-voltage control module, a working voltage provided by the power battery pack under control of the high-voltage wake-up signal.

Step S220, controlling, by the high-voltage control module, the high-voltage transmission module to be turned on, providing the working voltage to the synchronous rectifying module by the turned-on high-voltage transmission module, and converting high-voltage electric energy provided by the power battery pack into low-voltage electric energy Step S230, transmitting, under control of the synchronous rectifying module, the low-voltage electric energy to the low-voltage controller, and waking up the battery management system.

In an embodiment, the step S210 of converting, by the conversion unit, the low-voltage power signal detected at the low-voltage input port into the high-voltage wake-up signal may specifically include the following steps:

Step S211, rectifying and filtering the low-voltage power signal detected at the low-voltage input port.

Step S212, converting the rectified and filtered low-voltage power signal into the high-voltage wake-up signal.

In an embodiment, the conversion unit includes any of an optocoupler circuit, a flyback power circuit and a forward power circuit.

In an embodiment, the high-voltage control module may include a flyback control module and a forward control module; and the step S210 of receiving, by the high-voltage control module, the working voltage provided by the power battery pack under the control of the high-voltage wake-up signal may specifically include the following steps:

Step S213, receiving the high-voltage wake-up signal through an enabling terminal of the flyback control module.

Step S214, controlling, by the high-voltage wake-up signal, a connection between a flyback power terminal of the flyback control module and the power battery pack to be turned on, so that the flyback power terminal receives the working voltage provided by the power battery pack.

Step S215, outputting the working voltage to a forward power terminal of the forward control module through a first flyback output terminal of the flyback control module, so that the forward control module start working.

In an embodiment, the high-voltage control module includes a flyback control module and a forward control module, and the high-voltage transmission module includes a first transformer and a second transformer. In this embodiment, the step S220 may specifically include the following step:

Step S221, controlling, by the flyback control module, the first transformer to be turned on, so that the power battery pack provides the working voltage to the synchronous rectifying module through the turned-on first transformer.

In an embodiment, the high-voltage transmission module further includes a first switching element. In this embodiment, the step S221 may specifically include the following steps:

Step S221-01, controlling the first switching element to be turned on and turned off through a pulse width modulation signal output from a second flyback output terminal of the flyback control module.

Step S221-02, when the first switching element is turned on, the power battery pack is connected to the primary winding of the first transformer, and the primary winding of the first transformer stores energy using the high-voltage electric energy.

Step S221-03, when the first switching element is turned off, the power battery pack is disconnected from the primary winding of the first transformer, and the energy stored in the primary winding of the first transformer is coupled to the secondary winding of the first transformer.

Step S221-04, the high-voltage transmission module provides the working voltage to the synchronous rectifying module through the energy coupled to the secondary winding of the first transformer.

In an embodiment, the step S221-04 may specifically include rectifying and filtering the energy coupled to the secondary winding of the first transformer, and providing the working voltage to the synchronous rectifying module using the rectified and filtered energy.

Step S222, controlling, by the forward control module, the second transformer to be turned on, and converting the high-voltage electric energy in the power battery pack into the low-voltage electric energy through the turned-on second transformer.

In an embodiment, the high-voltage transmission module further includes a second switching element. In this embodiment, the step S223 may specifically include the following steps:

Step S222-01, controlling the second switching element to be turned on and turned off through a pulse width modulation signal provided by the forward control module.

Step S222-02, when the second switching element is turned on, the power battery pack is connected to a primary winding of the second transformer, and couples the high-voltage electric energy to a secondary winding of the second transformer through the primary winding of the second transformer, to obtain the low-voltage electric energy output from the secondary winding of the second transformer.

In an embodiment, the transmitting, under the control of the synchronous rectifying module, the low-voltage electric energy to the low-voltage controller, and waking up the battery management system by the low-voltage controller includes the following step:

Detecting the low-voltage electric energy by the synchronous rectifying module, and transmitting, when the low-voltage electric energy satisfies a low-voltage threshold condition, the low-voltage electric energy to the low-voltage controller, to wake up the battery management system by the low-voltage controller.

In an embodiment, the wake-up system further includes a clamping circuit module. In this embodiment, the wake-up method for the battery management system further includes the following step:

Step S250, absorbing leakage inductance energy of the second transformer by the clamping circuit module, so that a clamping voltage of a clamping switching element satisfies a preset voltage threshold.

According to the wake-up method for the battery management system in the embodiments of the present application, when the BMS is in sleep and the battery pack of the high-voltage side is required to provide a stable power for the low-voltage side, only a wake-up power is necessary at the input terminal of the low-voltage side to wake up the high-voltage transmission unit, and thus the voltage in the high-voltage power battery pack is converted to provide a stable input voltage for the low-voltage side, thereby the normal operation of the entire BMS system is resumed. In the embodiments of the present application, the wake-up system for the battery management system has a simple circuit structure design, a few components and a good portability, and may be well compatible with various low-voltage power systems.

It should be noted that the present application is not limited to the specific configurations and processes described in the above embodiments and shown in the drawings. For the convenience and briefness of the description, detailed description of the known methods are omitted herein, and the specific working processes of the above systems, modules and units may refer to the corresponding processes in the aforementioned method embodiments, which are omitted herein.

According to the embodiments of the present application, the processes described above referring to the flowcharts may be implemented as a computer software program. For example, the embodiments of the present application include a computer program product, including a computer program tangibly contained on a machine-readable medium, and the computer program includes program codes for executing the methods shown in the flowcharts. In such embodiments, the computer program may be downloaded and installed from the Internet, and/or installed from a removable storage medium.

In the above embodiments, the methods and systems may be completely or partially implemented by a software, a hardware or any combination thereof. When implemented by a software, the methods and systems may be completely or partially implemented in the form of a computer program product. The computer program product includes one or more computer instructions that, when executed on a computer, cause the computer to execute the methods described in the aforementioned various embodiments. When the computer program instructions are loaded and executed on the computer, all or a part of the processes or functions described in the embodiments of the present application are generated. The computer may be a general-purpose computer, a dedicated computer, a computer network, or other programmable apparatuses. The computer instructions may be stored in a computer-readable storage medium or transmitted from one computer-readable storage medium to another computer-readable storage medium. For example, the computer instructions may be transmitted from a website, computer, server or data center to another website, computer, server or data center by wired means (for example, a coaxial cable, an optical fiber, a digital subscriber line (DSL)) or wireless means (for example, infrared, wireless, microwave, etc.). The computer-readable storage medium may be any available medium accessible to the computer, or a data storage device, such as a server or a data center, containing one or more available media. The available media may be magnetic media (for example, a floppy disk, a hard disk, and a magnetic tape), optical media (for example, a DVD), or semiconductor media (for example, a solid state disk), etc.

The apparatus embodiments described above are merely schematic, in which the units illustrated as separate components may or may not be physically separated, and the components displayed as units may or may not be physical units, that is, the components may be located at one place or distributed to a plurality of network units. The objects of the solutions of the embodiments may be fulfilled by selecting a part or all of the modules according to actual needs. A person of ordinary skill in the art may understand and implement the embodiments without any creative effort.

Finally, it should be noted that the above embodiments are merely intended to describe the technical solutions of the present application, instead of limiting the present application. Although the present application has been described in detail with reference to the aforementioned embodiments, a person of ordinary skill in the art should understand that the technical solutions described in the aforementioned embodiments may be modified, or some or all of the technical features therein may be equivalently substituted, and these modifications or substitutions would not cause the essence of the corresponding technical solutions to depart from the scope of the technical solutions of the embodiments of the present application.

What is claimed is:

1. A wake-up method for a battery management system, wherein the wake-up method is used in a wake-up system for the battery management system, and the wake-up system comprises a power battery pack, a low-voltage input port, a conversion unit, a high-voltage control module, a high-voltage transmission module, a synchronous rectifying module and a low-voltage controller, wherein
   the wake-up method for the battery management system comprises:
   converting, by the conversion unit, a low-voltage power signal detected at the low-voltage input port into a high-voltage wake-up signal, and receiving, by the high-voltage control module, a working voltage provided by the power battery pack under control of the high-voltage wake-up signal;
   controlling, by the high-voltage control module, the high-voltage transmission module to be turned on, providing the working voltage to the synchronous rectifying module by the turned-on high-voltage transmission module, and converting high-voltage electric energy provided by the power battery pack into low-voltage electric energy; and
   transmitting, under control of the synchronous rectifying module, the low-voltage electric energy to the low-voltage controller, and waking up the battery management system by the low-voltage controller.

2. The wake-up method for the battery management system according to claim 1, wherein the converting, by the conversion unit, the low-voltage power signal detected at the low-voltage input port into the high-voltage wake-up signal comprises:
   rectifying and filtering the low-voltage power signal detected at the low-voltage input port; and
   converting the rectified and filtered low-voltage power signal into the high-voltage wake-up signal.

3. The wake-up method for the battery management system according to claim 1, wherein
   the conversion unit comprises any of an optocoupler circuit, a flyback power circuit, and a forward power circuit.

4. The wake-up method for the battery management system according to claim 1, wherein the high-voltage control module comprises a flyback control module and a forward control module, and
   wherein the receiving, by the high-voltage control module, the working voltage provided by the power battery pack under the control of the high-voltage wake-up signal comprises:
   receiving the high-voltage wake-up signal through an enabling terminal of the flyback control module;
   controlling, by the high-voltage wake-up signal, a connection between a flyback power terminal of the flyback control module and the power battery pack to be turned on, so that the flyback power terminal receives the working voltage provided by the power battery pack; and
   outputting the working voltage to a forward power terminal of the forward control module through a first flyback output terminal of the flyback control module, so that the forward control module starts working.

5. The wake-up method for the battery management system according to claim 1, wherein the high-voltage control module comprises a flyback control module and a forward control module, and the high-voltage transmission module comprises a first transformer and a second transformer, and
   wherein the controlling, by the high-voltage control module, the high-voltage transmission module to be turned on, providing the working voltage to the synchronous rectifying module by the turned-on high-voltage transmission module, and converting the high-voltage electric energy provided by the power battery pack into the low-voltage electric energy comprises:
   controlling, by the flyback control module, the first transformer to be turned on, so that the power battery pack provides the working voltage to the synchronous rectifying module through the turned-on first transformer; and
   controlling, by the forward control module, the second transformer to be turned on, and converting the high-voltage electric energy in the power battery pack into the low-voltage electric energy through the turned-on second transformer.

6. The wake-up method for the battery management system according to claim 5, wherein the high-voltage transmission module further comprises a first switching element;
   the controlling, by the flyback control module, the first transformer to be turned on, so that the power battery pack provides the working voltage to the synchronous rectifying module through the turned-on first transformer comprises:
   controlling the first switching element to be turned on and turned off through a pulse width modulation signal output from a second flyback output terminal of the flyback control module, wherein when the first switching element is turned on, the power battery pack is connected to a primary winding of the first transformer, and the primary winding of the first transformer stores energy using the high-voltage electric energy;

when the first switching element is turned off, the power battery pack is disconnected from the primary winding of the first transformer, and the energy stored in the primary winding of the first transformer is coupled to a secondary winding of the first transformer; and providing, by the high-voltage transmission module, the working voltage to the synchronous rectifying module through the energy coupled to the secondary winding of the first transformer.

7. The wake-up method for the battery management system according to claim 6, wherein the providing the working voltage to the synchronous rectifying module through the energy coupled to the secondary winding of the first transformer comprises:

rectifying and filtering the energy coupled to the secondary winding of the first transformer, and providing the working voltage to the synchronous rectifying module using the rectified and filtered energy.

8. The wake-up method for the battery management system according to claim 5, wherein the high-voltage transmission module further comprises a second switching element;

the controlling, by the forward control module, the second transformer to be turned on, and converting the high-voltage electric energy in the power battery pack into the low-voltage electric energy through the turned-on second transformer comprises:

controlling the second switching element to be turned on and turned off through a pulse width modulation signal provided by the forward control module, and wherein when the second switching element is turned on, the power battery pack is connected to a primary winding of the second transformer, and couples the high-voltage electric energy to a secondary winding of the second transformer through the primary winding of the second transformer, to obtain the low-voltage electric energy output from the secondary winding of the second transformer.

9. The wake-up method for the battery management system according to claim 1, wherein the transmitting, under the control of the synchronous rectifying module, the low-voltage electric energy to the low-voltage controller, and waking up the battery management system by the low-voltage controller comprises:

detecting the low-voltage electric energy by the synchronous rectifying module, and transmitting, when the low-voltage electric energy satisfies a low-voltage threshold condition, the low-voltage electric energy to the low-voltage controller, to wake up the battery management system by the low-voltage controller.

10. The wake-up method for the battery management system according to claim 5, wherein the wake-up system further comprises a clamping circuit module; and the wake-up method for the battery management system further comprises:

absorbing leakage inductance energy of the second transformer by the clamping circuit module, so that a clamping voltage of a clamping switching element in the clamping circuit module satisfies a preset voltage threshold.

11. A wake-up system for a battery management system, wherein the wake-up system comprises a power battery pack, a low-voltage input port, a conversion unit, a high-voltage control module, a high-voltage transmission module, a synchronous rectifying module and a low-voltage controller, wherein the low-voltage input port is connected to the high-voltage control module through the conversion unit, the high-voltage control module is connected to the high-voltage transmission module, the high-voltage transmission module is connected to the low-voltage controller through the synchronous rectifying module, and the low-voltage controller is connected to the battery management system, and wherein the low-voltage input port is configured to receive a low-voltage power signal;

the conversion unit is configured to convert the low-voltage power signal into a high-voltage wake-up signal;

the high-voltage control module is configured to receive, under control of the high-voltage wake-up signal, a working voltage provided by the power battery pack, and control the high-voltage transmission module to be turned on;

the high-voltage transmission module is configured to provide, when turned on, the working voltage to the synchronous rectifying module, and convert high-voltage electric energy in the power battery pack into low-voltage electric energy; and the synchronous rectifying module is configured to transmit, under control of the synchronous rectifying module, the low-voltage electric energy to the low-voltage controller, and wake up the battery management system by the low-voltage controller.

12. The wake-up system according to claim 11, the wake-up system further comprising a first rectifying and filtering unit connected between the low-voltage input port and an input terminal of the conversion unit, and configured to rectify and filter the low-voltage power signal, wherein the conversion unit is further configured to convert the rectified and filtered low-voltage power signal into the high-voltage wake-up signal.

13. The wake-up system according to claim 11, wherein the conversion unit comprises any of an optocoupler circuit, a flyback power circuit, and a forward power circuit.

14. The wake-up system according to claim 11, wherein the high-voltage control module comprises a flyback control module and a forward control module, wherein the flyback control module comprises an enabling terminal, a flyback power terminal, and a first flyback output terminal, and the forward control module comprises a forward power terminal, and wherein the flyback control module is configured to receive the high-voltage wake-up signal through the enabling terminal, and control, by the high-voltage wake-up signal, a connection between the flyback power terminal and the power battery pack to be turned on, so that the flyback power terminal receives the working voltage provided by the power battery pack; and the flyback control module is further configured to output the working voltage to the forward power terminal through the first flyback output terminal, so that the forward control module starts working.

15. The wake-up system according to claim 11, wherein the high-voltage control module comprises a flyback control module and a forward control module, and the high-voltage transmission module comprises a first transformer and a second transformer, wherein the flyback control module is further configured to control the first transformer to be turned on, so that the power battery pack provides the working voltage to the synchronous rectifying module through the turned-on first transformer; and the forward control module is further configured to control the second transformer to be turned on, and convert the high-voltage electric energy in the power battery pack into the low-voltage electric energy through the turned-on second transformer.

16. The wake-up system according to claim 15, wherein the high-voltage transmission module further comprises a first switching element, and a second flyback output terminal of the flyback control module is connected to a primary winding of the first transformer through the first switching element, and wherein the flyback control module is further configured to control the first switching element to be turned on and turned off through a pulse width modulation signal output from the second flyback output terminal;

when the first switching element is turned on, the power battery pack is connected to the primary winding of the first transformer, and the primary winding of the first transformer stores energy using the high-voltage electric energy;

when the first switching element is turned off, the power battery pack is disconnected from the primary winding of the first transformer, and the energy stored in the primary winding of the first transformer is coupled to a secondary winding of the first transformer; and the high-voltage transmission module is configured to provide the working voltage to the synchronous rectifying module through the energy coupled to the secondary winding of the first transformer.

17. The wake-up system according to claim 16, the wake-up system further comprising a second rectifying and filtering unit connected between the secondary winding of the first transformer and the synchronous rectifying module and configured to rectify and filter electric energy coupled to the secondary winding of the first transformer, wherein the high-voltage transmission module is further configured to provide the working voltage to the synchronous rectifying module using the rectified and filtered electric energy coupled to the secondary winding of the first transformer.

18. The wake-up system according to claim 15, wherein the high-voltage transmission module further comprises a second switching element, and the forward control module comprises a first forward output terminal, wherein the first forward output terminal is connected to a primary winding of the second transformer through the second switching element, and wherein the forward control module is further configured to control the second switching element to be turned on and turned off through a pulse width modulation signal provided by the first forward output terminal, and when the second switching element is turned on, the power battery pack is connected to the primary winding of the second transformer, and couples the high-voltage electric energy to a secondary winding of the second transformer through the primary winding of the second transformer, to obtain the low-voltage electric energy output from the secondary winding of the second transformer.

19. The wake-up system according to claim 11, wherein the synchronous rectifying module is configured to detect the low-voltage electric energy, and transmit, when the low-voltage electric energy satisfies a low-voltage threshold condition, the low-voltage electric energy to the low-voltage controller, to wake up the battery management system by the low-voltage controller.

20. The wake-up system according to claim 15, wherein the wake-up system further comprises a clamping circuit module configured to absorb leakage inductance energy of the second transformer, so that a clamping voltage of a clamping switching element in the clamping circuit module satisfies a preset voltage threshold.

* * * * *